US006674861B1

(12) United States Patent
Xu et al.

(10) Patent No.: US 6,674,861 B1
(45) Date of Patent: Jan. 6, 2004

(54) DIGITAL AUDIO WATERMARKING USING CONTENT-ADAPTIVE, MULTIPLE ECHO HOPPING

(75) Inventors: Changsheng Xu, Singapore (SG); Jiankang Wu, Singapore (SG); Qibin Sun, Singapore (SG); Kai Xin, Singapore (SG); Haizhou Li, Singapore (SG)

(73) Assignee: Kent Ridge Digital Labs, Singapore (SG)

(*) Notice: Subject to any disclaimer, the term of this patent is extended or adjusted under 35 U.S.C. 154(b) by 0 days.

(21) Appl. No.: 09/445,141

(22) PCT Filed: Jan. 27, 1999

(86) PCT No.: PCT/SG98/00111

§ 371 (c)(1), (2), (4) Date: Dec. 2, 1999

(87) PCT Pub. No.: WO00/39955

PCT Pub. Date: Jul. 6, 2000

(51) Int. Cl.[7] .................... G06F 1/24

(52) U.S. Cl. .................... 380/252; 380/264; 380/277; 380/278; 380/283

(58) Field of Search .................... 380/252, 264, 380/277, 278, 283

(56) References Cited

U.S. PATENT DOCUMENTS 4,939,515 A 7/1990 Adelson .................... 341/51
5,319,735 A 6/1994 Preuss et al. .............. 395/2.14
5,612,943 A 3/1997 Moses et al. ............... 369/124
5,636,292 A 6/1997 Rhoads et al. .............. 382/232
5,659,726 A 8/1997 Sandford, II et al. ........ 395/162
5,664,018 A 9/1997 Leighton .................. 380/54
5,687,191 A 11/1997 Lee et al. ................. 375/216
5,687,236 A 11/1997 Moskowitz et al. .......... 380/28
5,689,587 A 11/1997 Bender et al. ............. 382/232
5,822,532 A 10/1998 Ikeda .................... 395/200.54

FOREIGN PATENT DOCUMENTS

EP 0651554 5/1995
EP 0766468 4/1997

OTHER PUBLICATIONS

L. Boney, A.H. Tewfik, K.N. Hamdy, "Digital Watermarks . . . Signals" IEEE Int. Conf. On Multimedia Computing and Systems, pp. 124–132, Jun. 1996.

M.D. Swanson, B. Zhu and A.H. Tewfik, Transparent . . . Watermarking, Proc. IEEE Int. Conf. On Imaging Processing, vol. 3, pp. 211–214, 1996.

D. Gruhl, A. Lu and W. Bender "Echo Hiding, Proc. information Hiding Workshop", University of Cambridge, pp. 295–315, 1996.

Wolfgang, R.B. et al "A Watermark for Digital Images." IEEE vol. 3, (1996) pp. 219–222.

(List continued on next page.)

*Primary Examiner*—Thomas R. Peeso
(74) *Attorney, Agent, or Firm*—Ladas & Parry

(57) ABSTRACT

A method, an apparatus and a computer program product for adaptive, content-based watermark embedding of a digital audio signal (100) are disclosed. Corresponding watermark extracting techniques are also disclosed. Watermark information (102) is encrypted (120) using an audio digest signal, i.e. a watermark key (108). To optimally balance inaudibility and robustness when embedding and extracting watermarks (450), the original audio signal (100) is divided into fixed-length frames (1100, 1120, 1130) in the time domain. Echoes (S'[n], S"[n]) are embedded in the original audio signal (100) to represent the watermark (450). The watermark (450) is generated by delaying and scaling the original audio signal (100) and embedding it in the audio signal (100). An embedding scheme (104) is designed for each frame (1100, 1120, 1130) according to its properties in the frequency domain. Finally, a multiple-echo hopping module (160) is used to embed and extract watermarks in the frame (1100, 1120, 1130) of the audio signal (100). An audio watermarking system known as KentMark (Audio) is implemented.

81 Claims, 10 Drawing Sheets

OTHER PUBLICATIONS

Pitas, I. "A Method for Signature Casting on Digital Images," IEEE, vol. 3, (1996) pp. 215–218.

Low, S.H., et al. "Document Marking and Identification Using Both Line and Word Shifting." Proceedings of INFOCOM'95, vol. 2, (1995) pp. 853–860.

Cox, I.J., et al. "Secure Spread Spectrum Watermarking for Multimedia." IEEE Trans. on Image Processing, 6(12), (1997) pp. 1673–1687.

Hsu C.–T., et al. "Digital Watermarking for Video." Proceedings of ICIP, (1996) pp. 219–222.

Cox, I.J., et al. "A review of watermarking and the importance of perceptual modeling." Proceedings of SPIE Human Vision and Electronic Imaging, vol. 3016, (1997) pp. 92–99.

Linnartz, J.–P. M.G., et al. "A reliability model for the detection . . . " Proceedings of Benelux Symposium on Communication Theory, Enschede, The Netherlands, (1997) pp. 202–208.

DIGITAL AUDIO WATERMARKING USING CONTENT-ADAPTIVE, MULTIPLE ECHO HOPPING

FIELD OF THE INVENTION

The present invention relates to the field of digital audio signal processing, and in particular to techniques of watermarking a digital audio signal.

BACKGROUND

The recent growth of networked multimedia systems has significantly increased the need for the protection of digital media. This is particularly important for the protection and enhancement of intellectual property rights. Digital media includes text, software, and digital audio, video and images. The ubiquity of digital media available via the Internet and digital library applications has increased the need for new techniques of digital copyright protection and new measures in data security. Digital watermarking is a developing technology that attempts to address these growing concerns. It has become an area of active research in multimedia technology.

A digital watermark is an invisible structure that is embedded in a host media signal. Therefore, watermarking, or data hiding, refers to techniques for embedding such a structure in digital data. It is an application that embeds the least amount of data, but contrarily requires the greatest robustness. To be effective, a watermark should be inaudible or invisible within its host signal. Further, it should be difficult or impossible to remove by unauthorised access, yet be easily extracted by the owner or authorised person. Finally, it should be robust to incidental and/or intentional distortions, including various types of signal processing and geometric transformation operations.

Many watermarking techniques have been proposed for text, images and video. They mainly focus on the invisibility of the watermark and its robustness against various signal manipulations and hostile attacks. These techniques can be grouped into two categories: spatial domain methods and frequency domain methods.

In relation to text, image and video data, there is a current trend towards approaches that make use of information about the human visual system (HVS) in an attempt to produce a more robust watermark. Such techniques use explicit information about the HVS to exploit the limited dynamic range of the human eye.

Compared with the development of digital video and image watermarking techniques, watermarking digital audio provides special challenges. The human auditory system (HAS) is significantly more sensitive than HVS. In particular, the HAS is sensitive to a dynamic range for amplitude of one billion to one and for frequency of one thousand to one. Sensitivity to additive random noise is also acute. Perturbations in a sound file can be detected as low as one part in ten million (80 dB below ambient level).

Generally, the limit of perceptible noise increases as the noise content of a host audio signal increases. Thus, the typical allowable noise level remains very low.

Therefore, there is clearly a need for a system of watermarking digital audio data that is inaudible and robust at the same time.

SUMMARY

In accordance with a first aspect of the invention, there is disclosed a method of embedding a watermark in a digital audio signal. The method includes the step of: embedding at least one echo dependent upon the watermark in a portion of the digital audio signal, predefined characteristics of the at least one echo being dependent upon time and/or frequency domain characteristics of the portion of the digital audio signal to provide a substantially inaudible and robust embedded watermark in the digital audio signal.

Preferably, the method includes the step of digesting the digital audio signal to provide a watermark key, the watermark being dependent upon the watermark key. It may also include the step of encrypting predetermined information using the watermark key to form the watermark.

Preferably, the method includes the step of generating the at least one echo to have a delay and an amplitude relative to the digital audio signal that is substantially inaudible. The value of the delay and the amplitude are programmable.

Two or more echoes can be programmably sequenced having different delays and/or amplitudes. Two portions of the digital audio signal can be embedded with different echoes dependent upon the time and/or frequency characteristics of the digital audio signal.

In accordance with a second aspect of the invention, there is disclosed an apparatus for embedding a watermark in a digital audio signal. The apparatus includes: a device for determining time and/or frequency domain characteristics of the digital audio signal; and a device for embedding at least one echo dependent upon the watermark in a portion of the digital audio signal, predefined characteristics of the at least one echo being dependent upon the time and/or frequency domain characteristics of the portion of the digital audio signal to provide a substantially inaudible and robust embedded watermark in the digital audio signal.

In accordance with a third aspect of the invention, there is disclosed a computer program product having a computer readable medium having a computer program recorded therein for embedding a watermark in a digital audio signal. The computer program product includes: a module for determining time and/or frequency domain characteristics of the digital audio signal; and a module for embedding at least one echo dependent upon the watermark in a portion of the digital audio signal, predefined characteristics of the at least one echo being dependent upon the time and/or frequency domain characteristics of the portion of the digital audio signal to provide a substantially inaudible and robust embedded watermark in the digital audio signal.

In accordance with a fourth aspect of the invention, there is disclosed a method of embedding a watermark in a digital audio signal. The method includes the steps of: generating a digital watermark; adaptively segmenting the digital audio signal dependent upon at least one frequency and/or time domain characteristic into two or more frames containing respective portions of the digital audio signal; classifying each frame dependent upon at least one frequency and/or time domain characteristic of the portion of the digital audio signal in the frame; and embedding at least one echo in at least one of the frames, the echo being dependent upon the watermark and upon a classification of each frame determined by the classifying step, whereby a watermarked digital audio signal is produced.

Preferably, the watermark is dependent upon the digital audio signal. The method may also include the steps of: audio digesting the digital audio signal to provide an audio digest; and encrypting watermark information dependent upon the audio digest.

Preferably, the method further includes the step of extracting one or more features from each frame of the digital audio signal. It may also include the step of selecting an embedding scheme for each frame dependent upon the classification of each frame, the embedding scheme adapted dependent upon at least one time and/or frequency domain characteristic of the classification for the corresponding portion of the digital audio signal. Still further, the method may further include the step of embedding the at least one echo in at least one of the frames dependent upon the selected embedding scheme. The amplitude and the delay of the echo relative to the corresponding portion of the digital audio signal in the frame is defined dependent upon the embedding scheme so as to be inaudible. Optionally, at least two echoes are embedded in the frame.

Preferably, two or more echoes embedded in the digital audio signal are dependent upon a bit of the watermark.

In accordance with a fifth aspect of the invention, there is disclosed an apparatus for embedding a watermark in a digital audio signal. The apparatus includes: a device for generating a digital watermark; a device for adaptively segmenting the digital audio signal dependent upon at least one frequency and/or time domain characteristic into two or more frames containing respective portions of the digital audio signal; a device for classifying each frame dependent upon at least one frequency and/or time domain characteristic of the portion of the digital audio signal in the frame; and a device for embedding at least one echo in at least one of the frames, the echo being dependent upon the watermark and upon a classification of each frame determined by the classifying device, whereby a watermarked digital audio signal is produced.

In accordance with a sixth aspect of the invention, there is disclosed a computer program product having a computer readable medium having a computer program recorded therein for embedding a watermark in a digital audio signal. The computer program product includes: a module for generating a digital watermark; a module for adaptively segmenting the digital audio signal dependent upon at least one frequency and/or time domain characteristic into two or more frames containing respective portions of the digital audio signal; a module for classifying each frame dependent upon at least one frequency and/or time domain characteristic of the portion of the digital audio signal in the frame; and a module for embedding at least one echo in at least one of the frames, the echo being dependent upon the watermark and upon a classification of each frame determined by the classifying device, whereby a watermarked digital audio signal is produced.

In accordance with a seventh aspect of the invention, there is disclosed a method of extracting a watermark from a watermarked digital audio signal. The method includes the steps of: adaptively segmenting the watermarked digital audio signal into two or more frames containing corresponding portions of the watermarked digital audio signal; detecting at least one echo present in the frames; and code mapping the at least one detected echo to extract an embedded watermark, the mapping being dependent upon one or more embedding schemes used to embed the at least one echo in the watermarked digital audio signal.

Preferably, the method further includes the step of audio registering the watermarked digital audio signal with the original digital audio signal to determine any unauthorised modifications of the watermarked digital audio signal.

Preferably, the method further includes the step of decrypting the embedded watermark dependent upon an audio digest signal to derive watermark information, the audio digest signal being dependent upon an original digital audio signal.

In accordance with an eighth aspect of the invention, there is disclosed an apparatus for extracting a watermark from a watermarked digital audio signal. The apparatus includes: a device for adaptively segmenting the watermarked digital audio signal into two or more frames containing corresponding portions of the watermarked digital audio signal; a device for detecting at least one echo present in the frames; and a device for code mapping the at least one detected echo to extract an embedded watermark, the mapping being dependent upon one or more embedding schemes used to embed the at least one echo in the watermarked digital audio signal.

In accordance with an ninth aspect of the invention, there is disclosed a computer program product having a computer readable medium having a computer program recorded therein for extracting a watermark from a watermarked digital audio signal. The computer program product includes: a module for adaptively segmenting the watermarked digital audio signal into two or more frames containing corresponding portions of the watermarked digital audio signal; a module for detecting at least one echo present in the frames; and a module for code mapping the at least one detected echo to extract an embedded watermark, the mapping being dependent upon one or more embedding schemes used to embed the at least one echo in the watermarked digital audio signal.

BRIEF DESCRIPTION OF THE DRAWINGS

A small number of embodiments of the invention are described hereinafter with reference to the drawings, in which.

DETAILED DESCRIPTION

Figure 1:
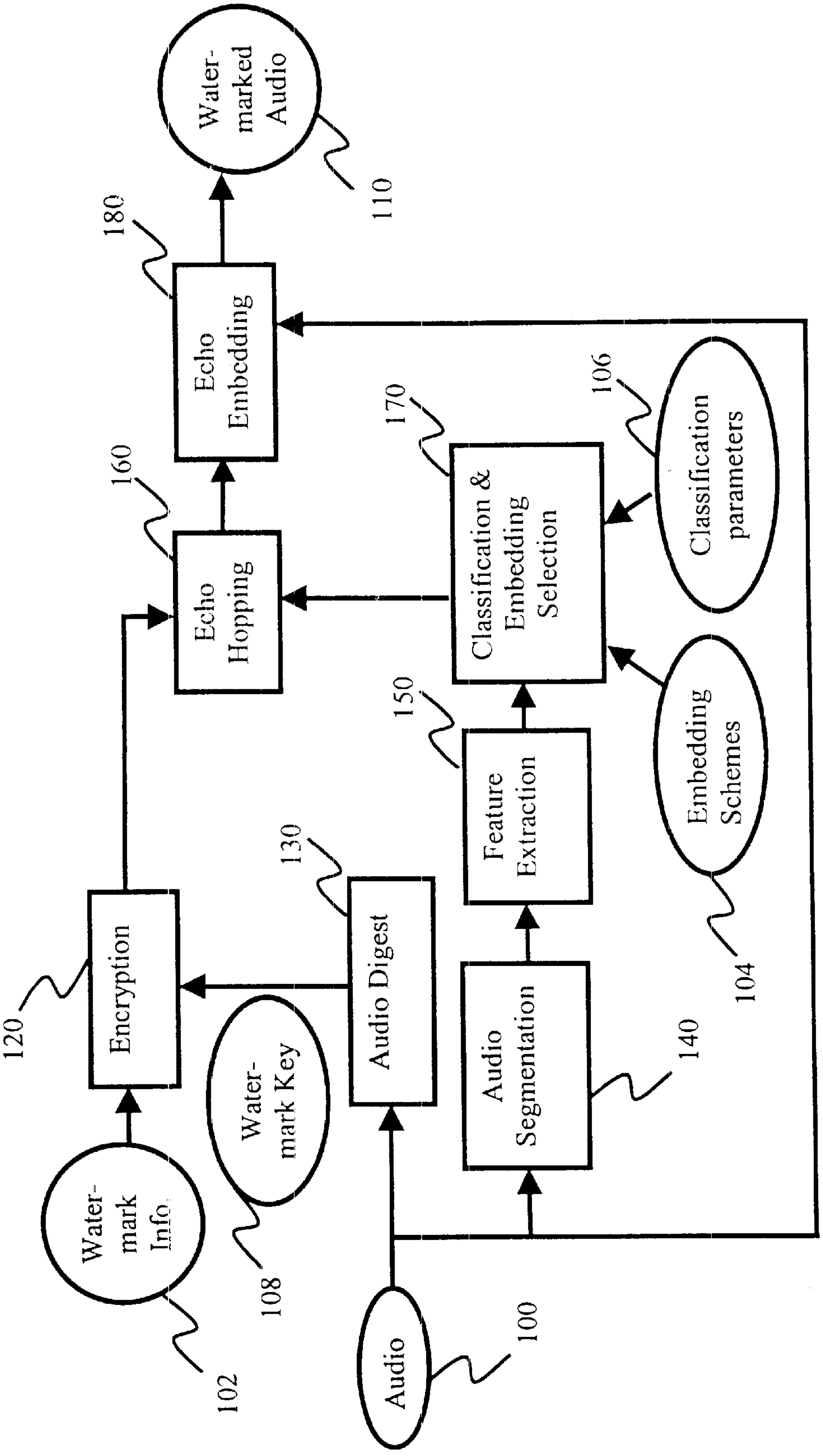
FIG. 1 is a high-level block diagram illustrating the watermark embedding process in accordance with a first embodiment of the invention.

A method, an apparatus and a computer program product for embedding a watermark in a digital audio signal are described. Correspondingly, a method, an apparatus and a computer program product for extracting a watermark from a watermarked audio signal are also described. In the following description, numerous specific details are set forth including specific encryption techniques to provide a more thorough description of the embodiments of the present invention. It will be apparent to one skilled in the art, however, that the present invention may be practised without these specific details. In other instances, well-known features are not described in detail so as not to obscure the present invention.

Four accompanying Appendices (1 to 4) form part of this description of the embodiments of the invention.

The embodiments of the invention provide a solution to the conflicting requirements of inaudibility and robustness in embedding and extracting watermarks in digital audio signals. This is done using content-adaptive, digital audio watermarking.

While the HAS has a large dynamic range, it often has a fairly small differential range. Consequently, loud sounds tend to mask out quieter sounds. Additionally, while the HAS has very low sensitivity to the amplitude and relative phase of a sound, it is difficult to perceive absolute phase. Finally, there are some environmental distortions so common as to be ignored by the listener in most cases. These characteristics can be considered as positive factors to design watermark embedding and extracting schemes.

Focusing on issues of inaudibility, robustness and tamper-resistance, four techniques are disclosed hereinafter. They are:

(1) content-adaptive embedding scheme modelling, (2) multiple-echo hopping and hiding, (3) audio registration using a Dynamic Time Warping technique, and (4) watermark encryption and decryption using an audio digest signal.

An application system called KentMark (Audio) is implemented based on these techniques. A brief overview of the four techniques employed by the embodiments of the present invention is set forth first.

Content-adaptive Embedding

In the content-adaptive embedding technique, parameters for setting up the embedding process vary dependent on the content of an audio signal. For example, because the content of a frame of digital violin music is very different from that of a recording of a large symphony orchestra in terms of spectral details, these two respective music frames are treated differently. By doing so, the embedded watermark signal better matches the host audio signal so that the embedded signal is perceptually negligible. This content-adaptive method couples audio content with the embedded watermark signal. Consequently, it is difficult to remove the embedded signal without destroying the host audio signal. Since the embedding parameters depend on the host audio signal, the tamper-resistance of this watermark embedding technique is also increased.

In broad terms, this technique involves segmenting an audio signal into frames in the time domain, classifying the frames as belonging to one of several known classes, and then encoding each frame with an appropriate embedding scheme. The particular scheme chosen is tailored to the relevant class of audio signal according to its properties in the frequency domain. To implement the content-adaptive embedding, two techniques are disclosed. They are audio-frame classification and embedding-scheme design techniques.

Multiple Echo Hopping and Hiding

Essentially, the echo hiding technique embeds a watermark into a host audio signal by introducing an echo. The embedded watermark itself is a predefined binary code. A time delay of the echo in relation to the original audio signal encodes a binary bit of the code. Two time delays can be used. One delay is for a binary one, and another is for a binary zero. Both time delays are chosen to remain below a predefined threshold that the human ear can sense. Thus, most human beings cannot resolve the resulting embedded audio as deriving from different sources. In addition to decreasing the time delay, distortion must remain imperceptible. The echo's amplitude and its decay rate are set below the audible threshold of a typical human ear.

To enhance the robustness and tamper-resistance of an embedded watermark, a multiple echo-hopping process can be employed. Instead of embedding one echo into an audio frame, multiple echoes with different time delays can be embedded into each audio sub-frame. In other words, a bit is encoded with multiple bits. Using the same detection rate, the amplitude of an echo can consequently be reduced. For attackers attempting to defeat the watermark, without knowledge of the parameters, this significantly reduces the possibility of unauthorised echo detection and removal of a watermark.

Audio Registration Using DTW Technique

To prevent unauthorised attackers from re-scaling, inserting and/or deleting an audio signal in the time domain, a procedure is provided for registering an audio signal before watermark extraction.

In the registration process, a Dynamic Time Warping (DTW) technique is employed. The DTW technique resolves an optimal alignment path between two audio signals. Both the audio signal under consideration and the reference audio signal are segmented into fixed-length frames. The power spectral parameters in each frame are then calculated using a non-linear frequency scale method. An optimal path is generated that results in the minimal dissimilarity between the reference audio and the testing audio frame sequences. The registration is performed according to this optimal path. Any possible shifting, scaling, or other non-linear time domain distortion can be detected and recovered.

Watermark Encryption & Decryption Using Audio Digest Signal

To further improve system security and tamper-resistance, an audio digest signal from the original audio signal is generated as a watermark key to encrypt and decrypt the watermark signal. This serves to guarantee the uniqueness of a watermark signal, and prevent unauthorised access to the watermark.

1 Watermark Embedding

FIG. 1 illustrates a process of embedding watermarks in accordance with a first embodiment of the invention. A digital audio signal 100 is provided as input to an audio digest module 130, an audio segmentation module 140, and an echo embedding module 180. Using the digital audio signal 100, the audio digest module 130 produces a watermark key 108 that is provided as input to an encryption module 120. The watermark key 108 is an audio digest signal created from the original audio signal 100. It is also an output of the system. Predefined watermark information 102 is also provided as an input to the encryption module

120. The watermark information 102 is encrypted using the watermark key 108 and provided as input to an echo-hopping module 160.

The audio segmentation module 140 segments the digital audio signal 100 into two or more segments or frames. The segmented audio signal is provided as input to a feature extraction module 150. Feature measures are extracted from each frame to represent the characteristics of the audio signal in that frame. An exemplary feature extraction method using a non-linear frequency scale technique is described in Appendix 1. While a specific method is set forth, it will be apparent to one skilled in the art that, in view of the disclosure herein, that other techniques can be practised without departing from the scope and spirit of the invention. The feature extraction process is the same as the one used in the training process described hereinafter with reference to FIG. 4.

The extracted features from each frame of digital audio data 100 are provided as input to the classification and embedding selection module 170. This module 170 also receives classification parameters 106 and embedding schemes 104 as input. The parameters of the classifier and the embedding schemes are generated in the training process. Based on the feature measures, each audio frame is classified into one of the pre-defined classes and an embedding scheme is selected.

The output of the classification and embedding scheme selection module 170 is provided as an input to the echo-hopping module 160. Each embedding scheme is tailored to a class of the audio signal. Using the selected embedding scheme, the watermark is embedded into the audio frame using a multiple-echo hopping process. This produces a particular arrangement of echoes that are to be embedded in the digital audio signal 100 dependent upon the encrypted watermark produced by the module 120. The echo hopping sequence and the digital audio signal 100 are provided as an input to the echo embedding module 180. The echo embedding module 180 produces the watermarked audio signal 110 by embedding the echo hopping sequence into the digital audio signal 100. Thus, the watermark embedding process of FIG. 1 produces two outputs: a watermark key 108 digested from the original audio signal 100 and the final watermarked audio signal 110.

The foregoing embodiment of the invention and the corresponding watermark extraction process described hereinafter can be implemented in hardware or software form. That is, the functionality of each module can be implemented electronically or as software that is carried out using a computer. For example, the embodiment can be implemented as a computer program product. A computer program for embedding a watermark in a digital audio signal can be stored on a computer readable medium. Likewise, the computer program can be one for extracting a watermark from a watermarked audio signal. In each case, the computer program can be read from the medium by a computer, which in turn carries out the operations of the computer program. In yet another embodiment, the system depicted in FIG. 1 can be implemented as an Application Specific Integrated Circuit (ASIC), for example. The watermark embedding and extracting processes are capable of being implemented in a number of other ways, which will be apparent to those skilled in the art in view of this disclosure, without departing from the scope and spirit of the invention.

1.1 Echo Hopping

Figure 2:
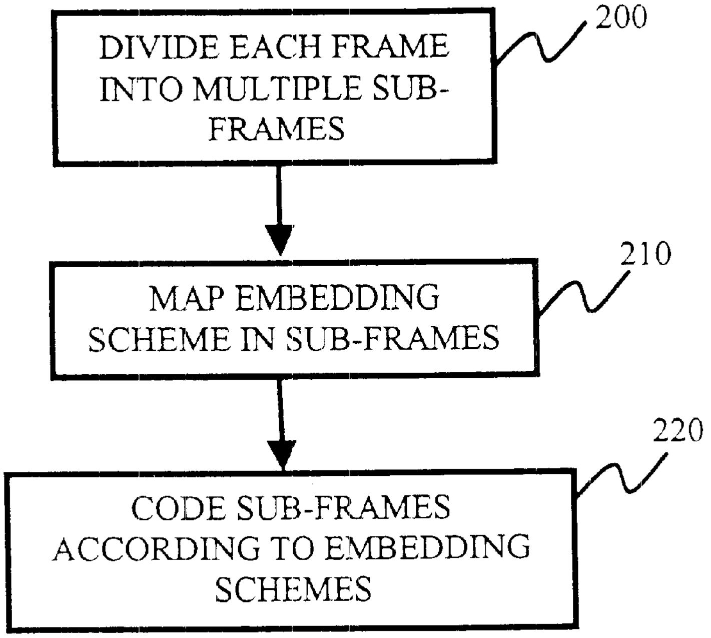
FIG. 2 is a flowchart illustrating the echo hopping process of FIG. 1.

FIG. 2 illustrates the functionality of the echo-hopping module 160 of FIG. 1 in further detail. To gain robustness in any subsequent detection process carried out on a watermarked audio signal, multiple echo hopping is employed. A bit in the watermark sequence is encoded as multiple echoes while each audio frame is divided into multiple sub-frames. Processing commences at step 200. In step 200, each frame of the digital audio signal is divided into multiple sub-frames. This may include two or more sub-frames.

In step 210, the embedding scheme 104 selected by the module 170 of FIG. 1 is mapped into the sub-frames. In step 220, the sub-frames are encoded according to the embedding scheme selected. Each sub-frame carries one echo. For each echo, there is a set of parameters determined in the embedding scheme design. In this way, one bit of the watermark is encoded as multiple bits in various patterns. This significantly reduces the possibility of echo detection and removal by attackers, since the parameters corresponding to each echo are unknown to them. In addition, more patterns can be chosen when embedding a bit. Processing then terminates.

1.2 Echo Embedding

Figure 3:
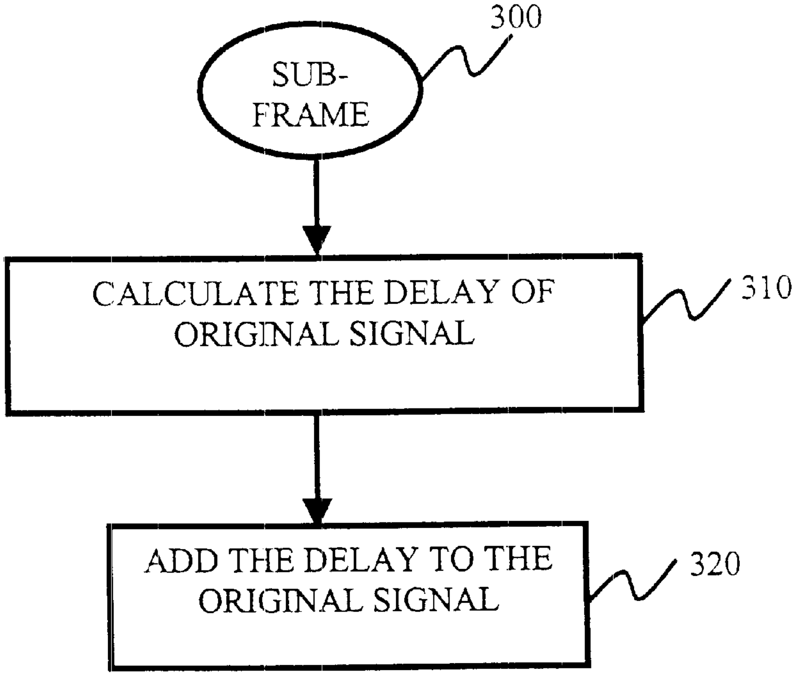
FIG. 3 is a flowchart illustrating the echo embedding process of FIG. 1.

FIG. 3 illustrates in further detail the functionality of the echo-embedding module 180 for embedding an echo into the audio signal shown in FIG. 1. A sub-frame 300 is provided as input to step 310 to calculate the delay of the original audio signal 100. In step 320, a predetermined delay is added to a copy of the original digital audio signal in the sub-frame to produce a resulting echo. The amplitude of the time-delayed audio signal is also adjusted so that it is substantially inaudible. In this echo embedding process, an audio frame is segmented into fixed sub-frames. Each sub-frame is encoded with one echo. For the ith frame, the embedded audio signal $S'_{ij}(n)$ is expressed as follows:

$$S'_{ij}(n)=S_{ij}(n)+\alpha_{ij}S_{ij}(n-\delta_{ij}), \quad (1)$$

$$S_{ij}(k)=0 \text{ if } k<0, \quad (2)$$

where $S_{ij}(n)$ is the original audio signal of the jth sub-frame in the ith frame, $\alpha_{ij}$ is the amplitude scaling factor, and $\delta_{ij}$ is the time delay corresponding to either bit 'one' or bit 'zero'.

Figure 12:
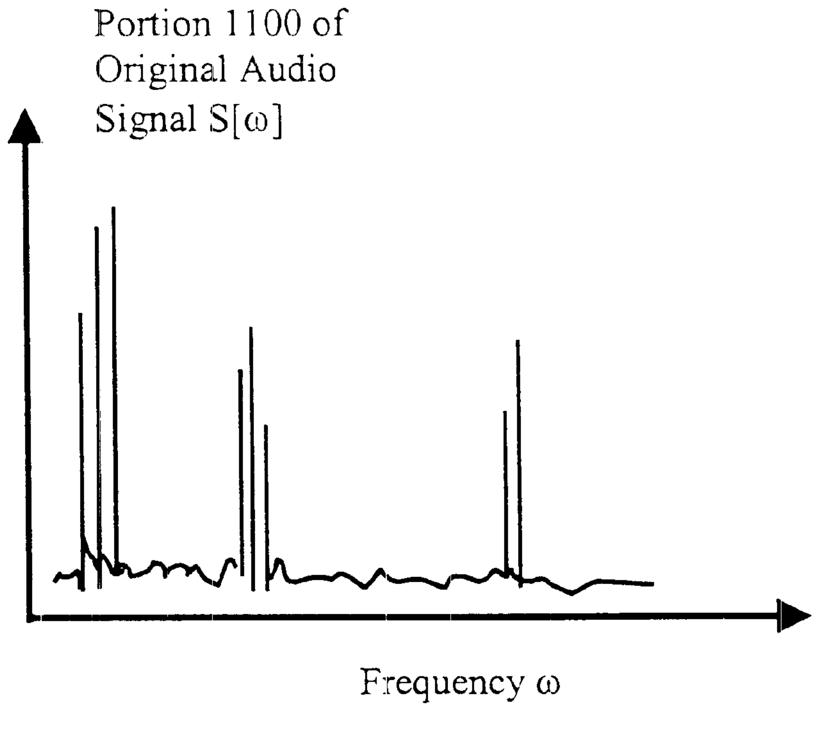
FIG. 12 is a diagram illustrating the spectra corresponding to a frame of the original audio signal shown in FIG. 11A.

FIG. 11 is a timing diagram illustrating this process. With reference to FIG. 11A, a frame 1100 of an original digital audio signal S[n] is shown. Preferably, the frames are fixed length. The amplitude of the signal S[n] is shown normalised within a scale of −1 to 1. Dependent upon the content of the audio signal S[n], it is processed as a number of frames (only one of which is shown in FIG. 11). FIG. 12 depicts exemplary spectra for the frame 1100. In turn, the representative frame 1100 is processed as three sub-frames 1110, 1120, 1130 with starting points n0, n1, and n2, respectively in this example.

Figure 11A:
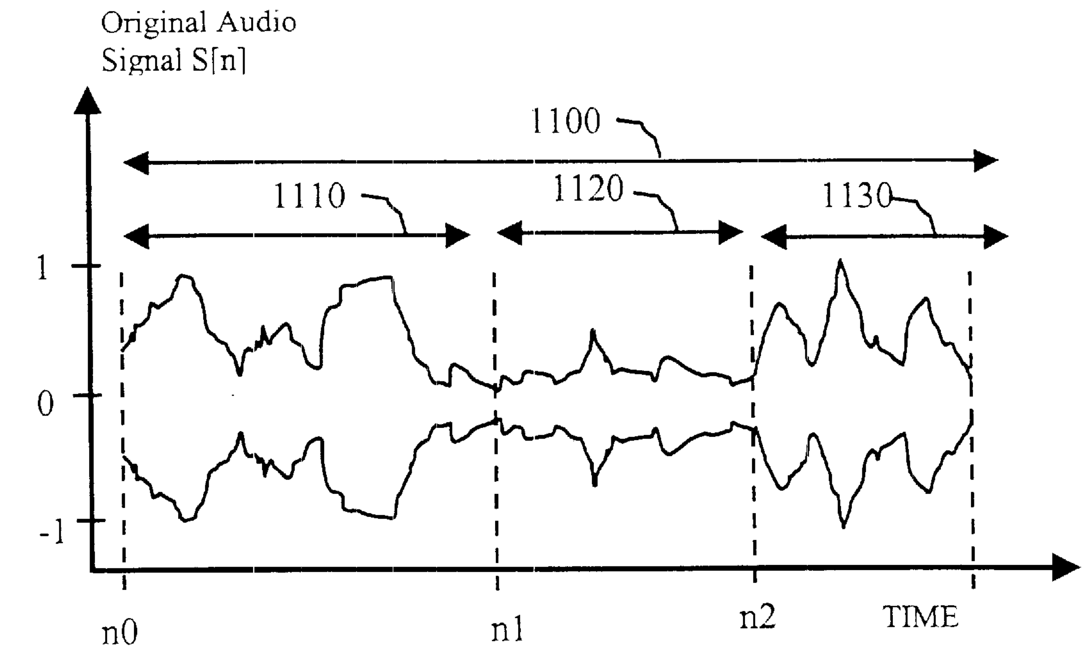
FIGS. 11A–11D are timing diagrams illustrating the process of embedding echoes in a digital audio signal to produce a watermarked audio signal.
Figure 11B:
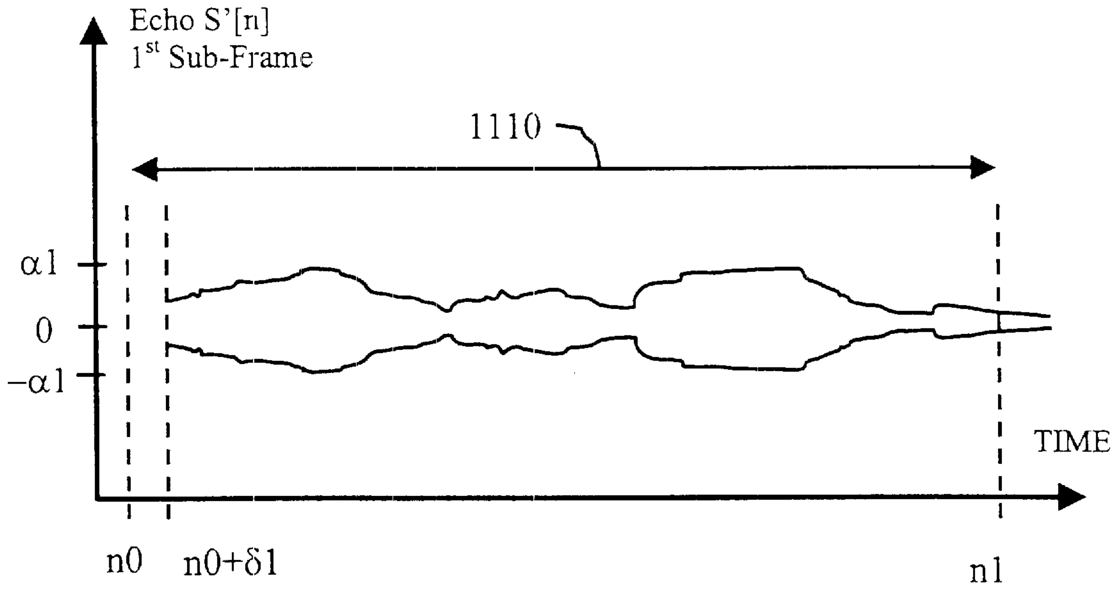
Figure 11C:
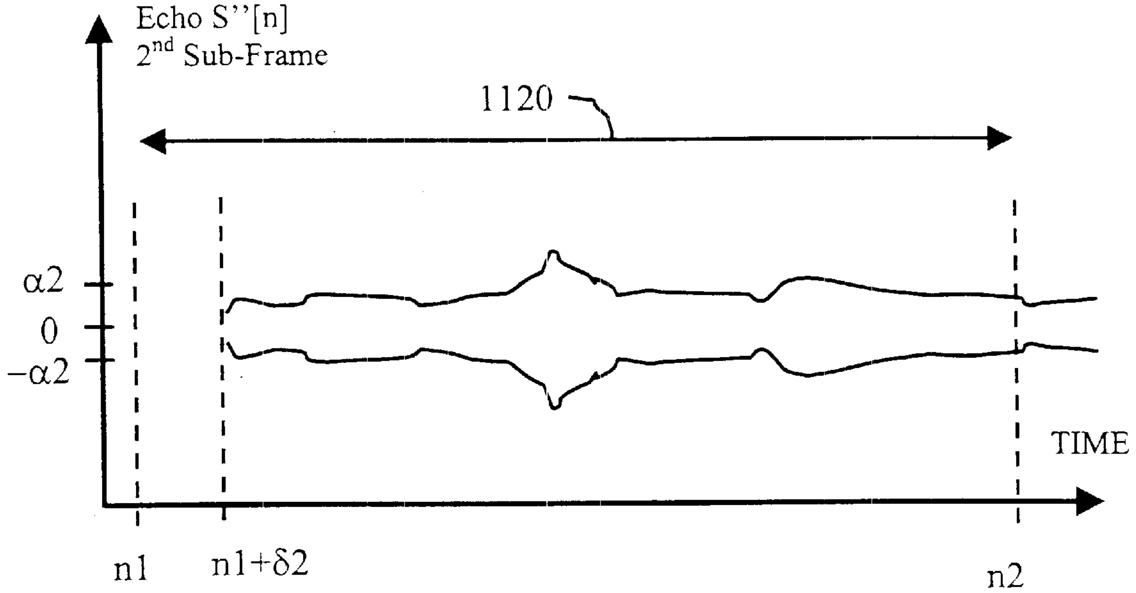
Figure 11D:
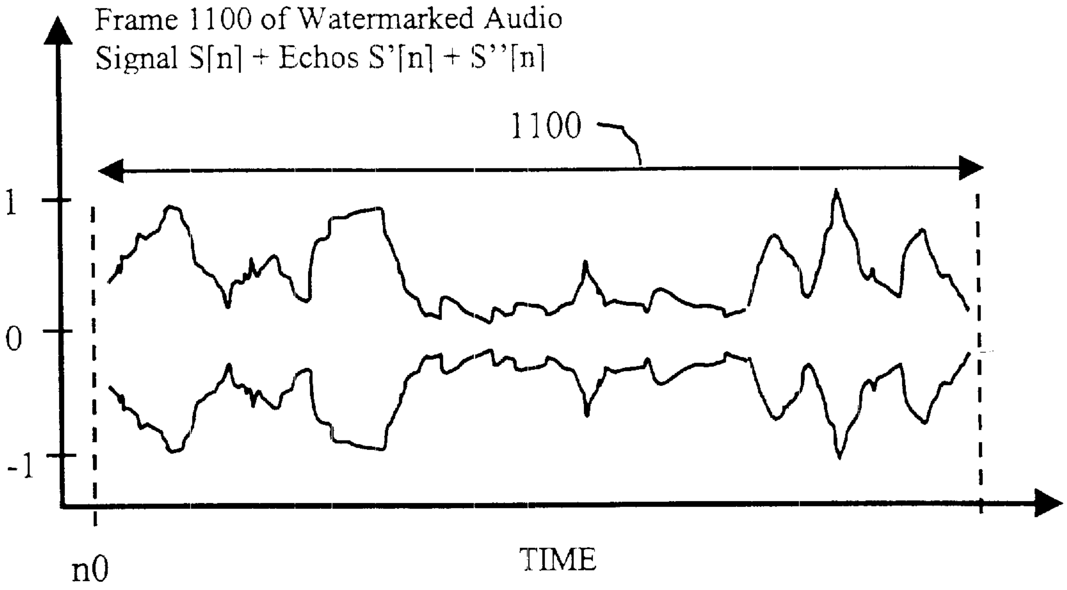

The first sub-frame 1110 is embedded with an echo S'[n] shown in FIG. 11B. The sub-frame 1110 starts at n0 and ends before n1. The first echo S'[n]=α1×S[n+δ1]. The second sub-frame 1120 is embedded with an echo S"[n] shown in FIG. 11C. The second echo S"[n]=α2×S[n+δ2]. Both scale factors α1 and α2 are significantly less than the amplitude of the audio signal S[n]. Likewise the delays δ1 and δ2 are not detectable in the HAS. The resulting frame 1100 of the watermarked audio signal S[n]+S'[n]+S"[n] is shown in FIG. 11D. The difference between frame 1100 in FIG. 11A and in FIG. 11D is virtually undetectable to the HAS.

2 Watermark Encryption and Decryption

Figure 6:
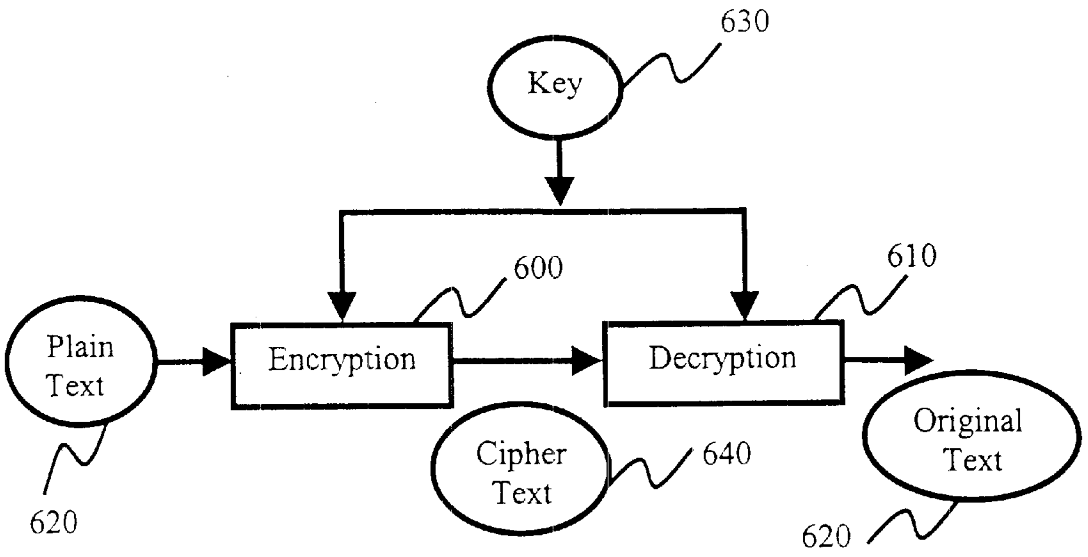
FIG. 6 is a block diagram depicting the relationship of encryption and decryption process shown in FIGS. 1 and 4, respectively.

The relationship between encryption and decryption processes is shown in FIG. 6. Encryption 600 is a process of encoding a message or data, e.g. plain text 620, to produce a representation of the message that is unintelligible or difficult to decipher. It is conventional to refer to such a representation as cipher text 640.

Decryption 610 is the inverse process to transform an encrypted message 640 back into its original form 620. Cipher text and plain text are merely naming conventions.

Some form of encryption/decryption key 630 is used in both processes 600, 610.

Formally, the transformations between plain text and cipher text are denoted C=E(K,P) and P=D(K,C), where C represents the cipher text, E is the encryption process, P is the plain text, D is the decryption process, and K is a key to provide additional security.

Many forms of encryption and corresponding decryption are well known to those skilled in the art, which can be practised with the invention. These include LZW encryption, for example.

2.1 Audio Digest

Figure 7:
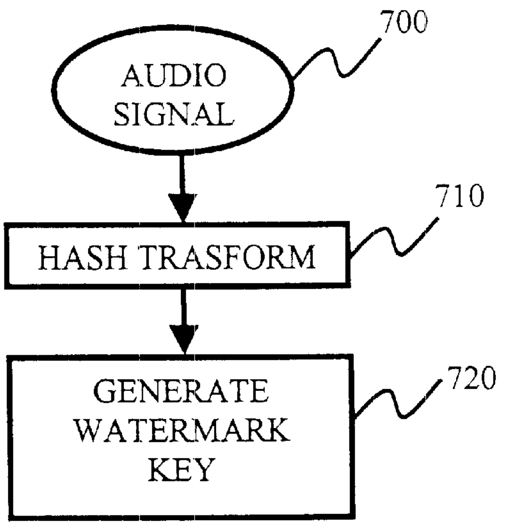
FIG. 7 is a flowchart of the audio digesting process for generating a watermark key shown in FIG. 1.

FIG. 7 is a flow diagram depicting a process of generating an audio digest signal used as a security key to encrypt and decrypt watermark information to produce a watermark. The original audio signal 700 is provided as input to step 710, which performs a hash transform on the audio signal 700. In particular, a one-way hash function is employed. A hash function converts or transforms data to an "effectively" unique representation, normally much smaller in size. Different input values produce different output values. The transformation can be expressed as follows:

$$K=H(S), \quad (3)$$

where S denotes the original audio signal, K denotes the audio digest signal, and H denotes the one-way Hash function.

In step 720, a watermark key is generated. The watermark key produced is therefore a shorter representation of the input digital audio data. Processing then terminates.

3 Adaptive Embedding Scheme Modelling

Modelling of the adaptive embedding process is an essential aspect of the embodiments of the invention. It includes two key parts:

1. Audio clustering and embedding process design (or training process, in other words); and
2. Audio classification and embedding scheme selection.

Figure 8:
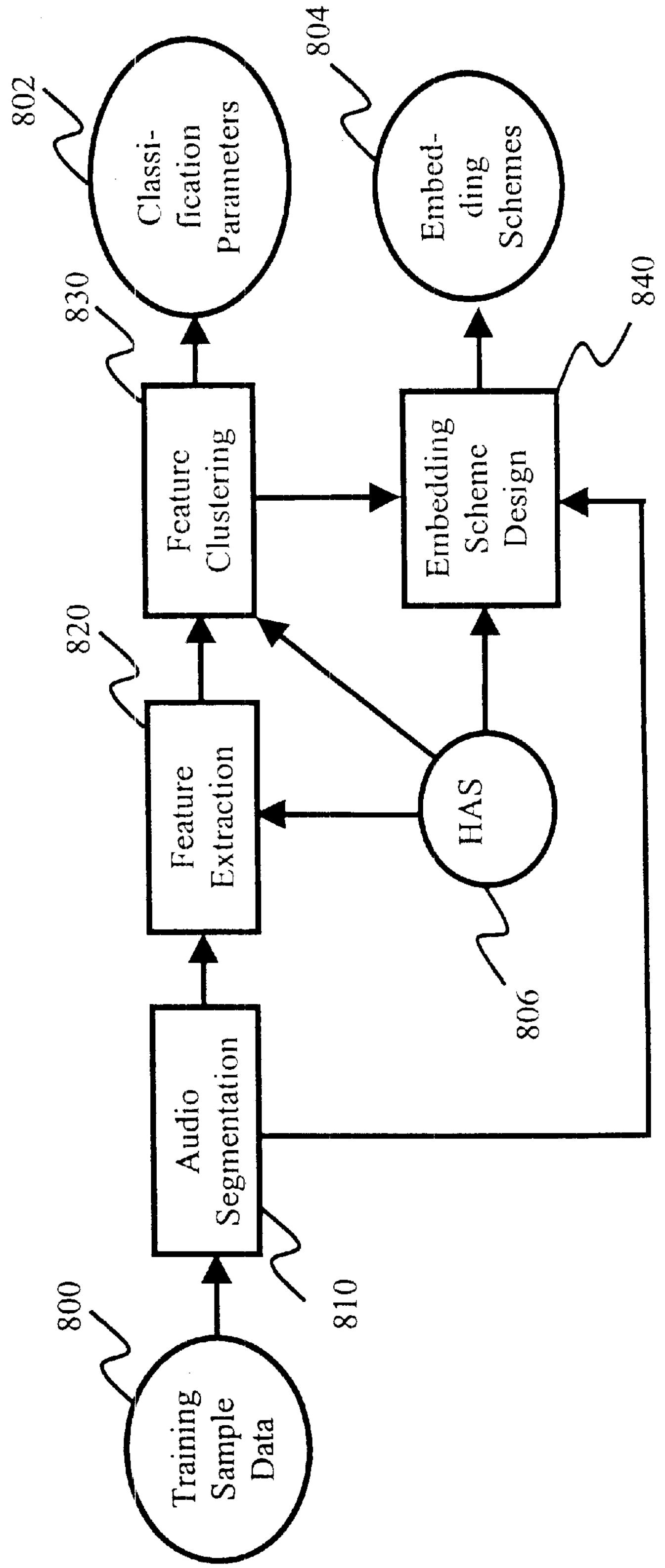
FIG. 8 is a block diagram illustrating a training process to produce classification parameters and embedding scheme design for audio samples.

FIG. 8 depicts the training process for an adaptive embedding model. Adaptive embedding, or content-sensitive embedding, embeds watermarks differently for different types of audio signals. To do so, a training process is run for each category of audio signal to define embedding schemes that are well suited to the particular category or class of audio signal. The training process analyses an audio signal 800 to find an optimal way to classify audio frames into classes and then design embedding schemes for each of those classes.

Training sample data 800 is provided as input to an audio segmentation module 810. The training data should be sufficient to be statistically significant. The segmented audio that results is provided as input to a feature extraction module 820 and the embedding scheme design module 840. A model of the human auditory system (HAS) 806 is also provided as input to the feature-extraction module 820, the feature-clustering module 830, and the embedding-scheme design module 840. Inaudibility or the sensitivity of human auditory system and resistance to attackers are taken into consideration.

The extracted features produced by module 820 are provided as input to the feature-clustering module 830. The feature-clustering module 830 produces the classification parameters 820 and provides input to the embedding-scheme design module 840. Audio signal frames are clustered into data clusters, each of which forms a partition in the feature vector space and has a centroid as its representation. Since the audio frames in a cluster are similar, embedding schemes are designed dependent on the centroid of the cluster and the human audio system model 806. The embedding-scheme design module 840 produces a number of embedding schemes 804 as output. Testing of the design of an embedding scheme is required to ensure inaudibility and robustness of the resulting watermark. Consequently, an embedding scheme is designed for each class/cluster of signal, which is best suited to the host signal.

The training process need only be performed once for a category of audio signals. The derived classification parameters and the embedding schemes are used to embed watermarks in all audio signals in that category.

With reference to the audio classification and embedding scheme selection module 170 of FIG. 1, similar pre-processing is conducted to convert the incoming audio signal into feature frame sequences. Each frame is classified into one of the predefined classes. An embedding scheme for a frame is chosen, which is referred to as the content-adaptive embedding scheme. In this way, the watermark code is embedded frame-by-frame into the host digital audio signal.

An exemplary process of audio embedding modelling is set forth in detail in Appendix 3.

4 Watermark Extracting

Figure 4:
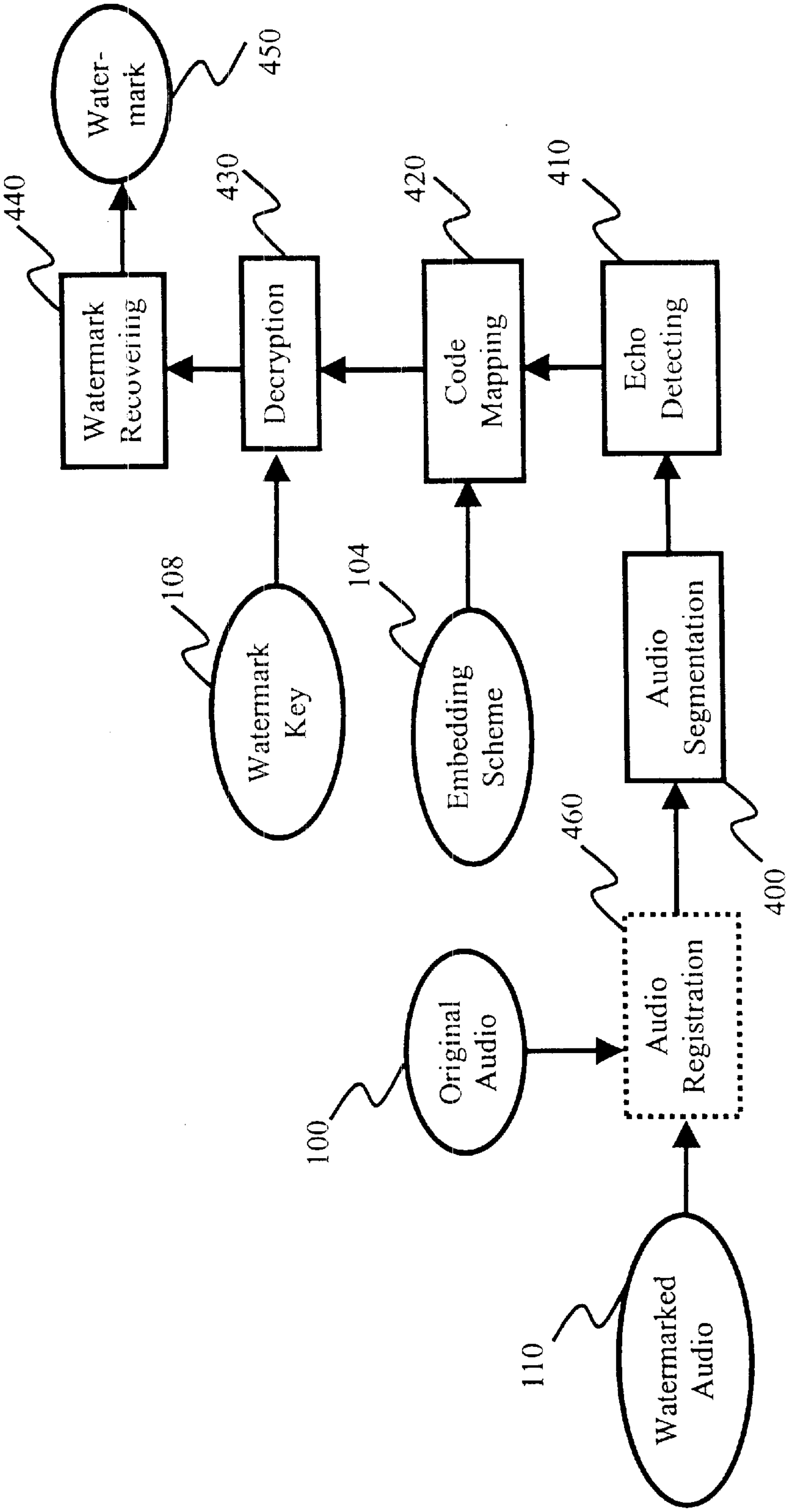
FIG. 4 is a block diagram illustrating the watermark extracting process of FIG. 1.

FIG. 4 illustrates a process of watermark extraction. A watermarked audio signal 110 is optionally provided as input to an audio registration module 460. This module 460 is a preferred feature of the embodiment shown in FIG. 4. However, this aspect need not be practised. The module 460 pre-processes the watermark audio signal 110 in relation to the original audio signal 100. This is done to protect the watermarked audio signal 110 from distortions. This is described in greater detail hereinafter.

The watermarked audio signal 110 is then provided as input to the audio segmentation module 400. This module 400 segments the watermark audio signal 110 into frames. That is, the (registered) watermarked audio signal is then segmented into frames using the same segmentation method as in the embedding process of FIG. 1. The output of this module 410 is provided as input to the echo-detecting module 410.

The echo-detecting module detects any echoes present in the currently processed audio frame. Echo detection is applied to extract echo delays on a frame-by-frame basis. Because a single bit of the watermark is hopped into multiple echoes through echo hopping in the embedding process of FIG. 1, multiple delays are detected in each frame. This method is more robust against attacks compared with a single-echo hiding technique. Firstly, one frame is encoded with multiple echoes, and any attackers do not know the coding scheme. Secondly, the echo signal is weaker and well hidden as a consequence of using multiple echoes.

The detected echoes determined by module 410 are provided as input to the code-mapping module 420. This module 420 also receives as input the embedding schemes 104 and produces the encrypted watermark, which is provided as output to the decryption module 430. This module performs the inverse operation of step 160 in FIG. 1.

The decryption module 430 also receives as input the watermark key 108. The extracted codes must be decrypted using the watermark key to recover the actual watermark. The output of the decryption 430 is provided to the watermark recovering module 440, which produces the original watermark 450 as it output. A message is produced from the binary sequence. The watermark 450 corresponds to the watermark information 102 of FIG. 1.

4.1 Echo Detecting

Figure 5:
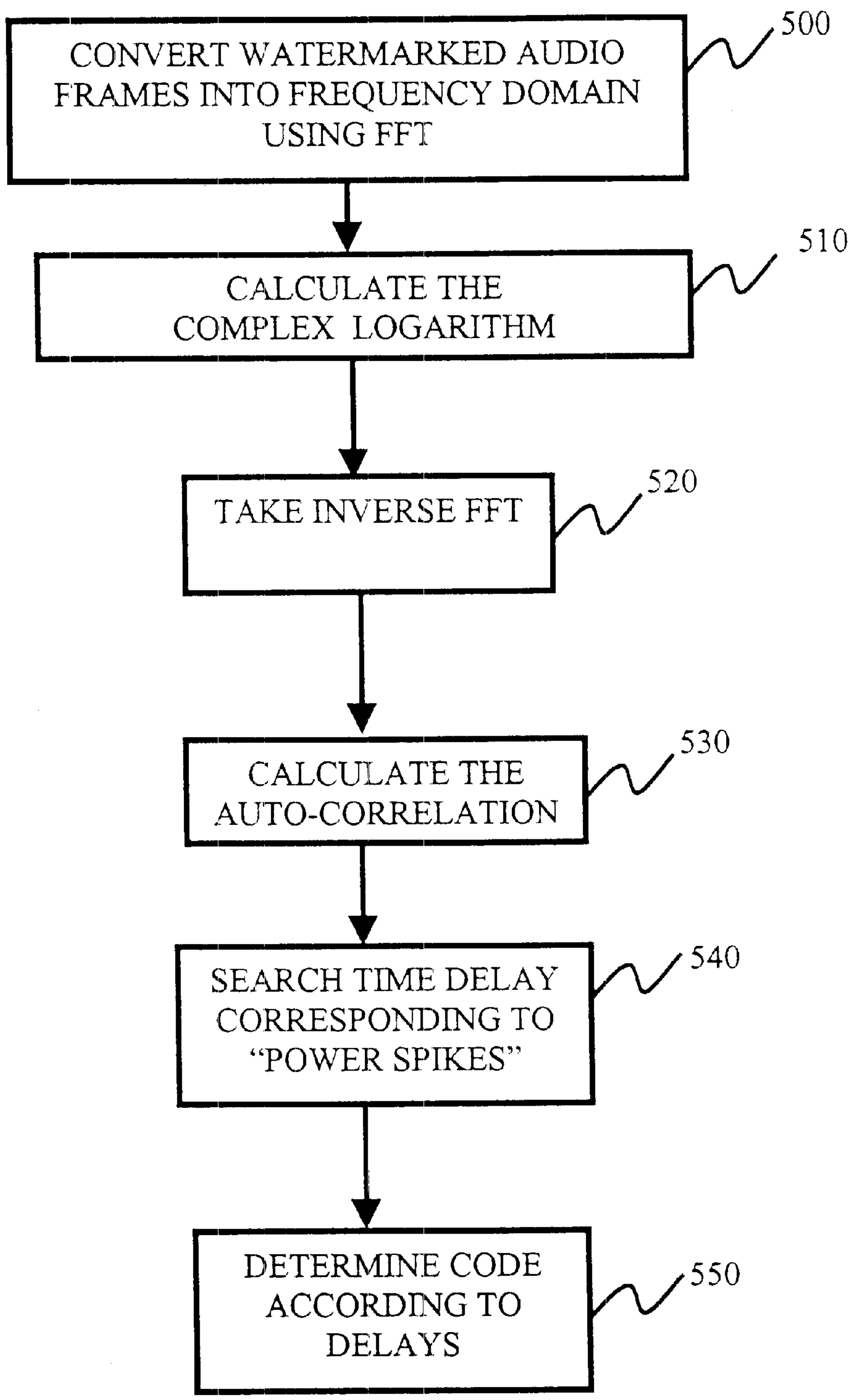
FIG. 5 is a flowchart illustrating the echo detecting process of FIG. 4.

FIG. 5 is a detailed flowchart illustrating the echo detecting process of FIG. 4. The key step involves detecting the spacing between the echoes. To do this, the magnitude (at relevant locations in each audio frame) of an autocorrelation of an embedded signal's cepstrum is examined. Processing commences in step 500. In step 500, a watermark audio frame is converted into the frequency domain. In step 510, the complex logarithm (i.e., log(a+bj)) is calculated. In step 520, the inverse fast Fourier transform (IFFT) is computed.

In step 530, the autocorrelation is calculated. Cepstral analysis utilises a form of homomorphic system that coverts a convolution operation into addition operations. It is useful in detecting the existence of echoes. From the autocorrelation of the cepstrum, the echoes in each audio frame can be found according to a "power spike" at each delay of the echoes. Thus, in step 540, a time delay corresponding to "power spike" is searched for. In step 550, a code corresponding to the delays is determined. Processing then terminates. An exemplary echo detecting process is set forth in detail in Appendix 2.

5 Audio Registration

Figure 9:
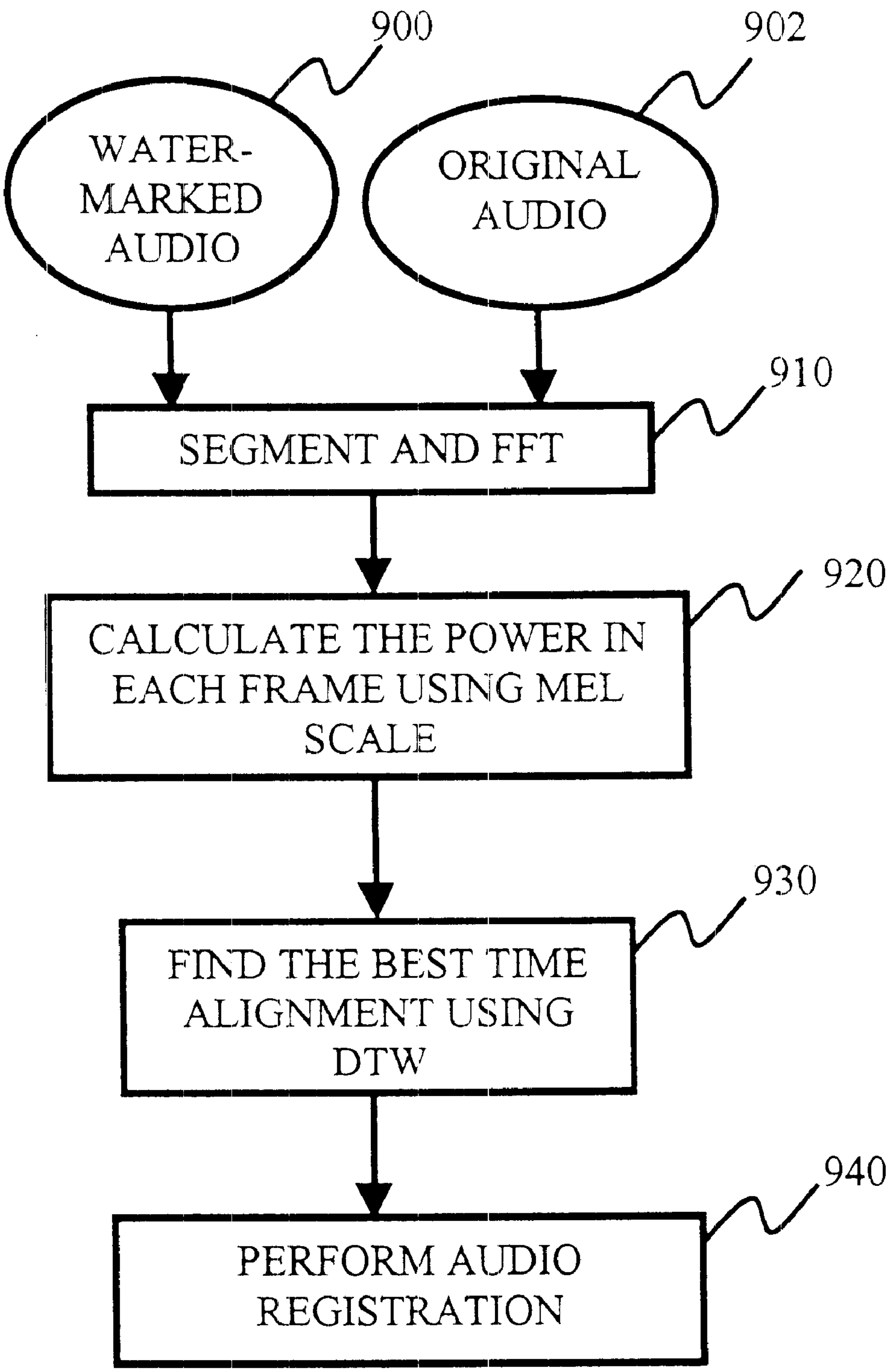
FIG. 9 is a flowchart illustrating the audio registration process of FIG. 4.

FIG. 9 illustrates the audio registration process of FIG. 4 that is performed before watermark detection. Audio registration is a pre-processing technique to recover a signal from potential attacks, such as insertion or deletion of a frame, re-scaling in the time domain. A watermarked audio signal 900 and an original signal 902 are provided as input. In step 910, the two input signals, 900, 902 are segmented and a fast Fourier transform (FFT) performed on each. In step 920, for each input signal, the power in each frame is calculated using the mel scale. In step 930, the best time alignment between the two frames is found using the dynamic time-warping procedure. Dynamic Time-Warping (DTW) technique is used to register the audio signals by comparing the watermarked signal with the original signal. This procedure is set forth in detail in Appendix 4. In step 940, an audio registration is made accordingly. Processing then terminates.

In the foregoing manner, a method, apparatus, and computer program product for embedding a watermark in a digital audio signal are disclosed. Also a corresponding method, apparatus, and computer program product for extracting a watermark from a watermarked audio signal are disclosed. Only a small number of embodiments are described. However, it will be apparent to one skilled in the art in view of this disclosure that numerous changes and/or modifications can be made without departing from the scope and spirit of the invention.

APPENDIX 1

A Feature Extraction Method Using Mel Scale Analysis

An audio signal is first segmented into frames. Spectral analysis is applied to each frame to extract features from the position of the signal for further processing. The mel scale analysis is employed as an example.

Psychophysical studies have shown that human perception of the frequency content of sounds, either for pure tones or for music signals, does not follow a linear scale. There are many non-linear frequency scales that approximate the sensitivity of the human ear. The mel scale is widely used because it has a simple analytical form:

$$m=1125\ \ln(0.0016f+1)\quad f>1000\text{ Hz}, \tag{4}$$

where 71 is the frequency in Hz and m is the mel scaled frequency. For $f \leqq 1000$ Hz, the scale is linear.

An example procedure of feature extraction is as follows:

(1) Segment the audio signal into m fixed-length frames;

(2) For each audio frame $s_i(n)$, a Fast Fourier Transform (FFT) is applied:

$$S_i(j\omega)=F(s_i(n)); \tag{5}$$

(3) Define a frequency band in the spectrum:

$f_{max}$, $f_{min}$;

(4) Determine the channel number $n_1$ and $n_2$, where $n_1$ for $f \leqq 1$ kHz and $n_2$ for $f>1$ kHz;

(5) For $f \leqq 1$ kHz, calculate the bandwidth of each band:

$$b=\frac{1000-f_{\min}}{n_1}; \tag{6}$$

(6) For $f \leqq 1$ kHz, calculate the center frequency of each band:

$$f_i=ib+f_{min}; \tag{7}$$

(7) For $f>1$ kHz, calculate the maximum and minimum mel scale frequency:

$$m_{max}=1125\ \ln(0.0016\ f_{max}+1);m_{min}=1125\ \ln(0.0016\times1000+1) \tag{8}$$

(8) For $f>1$ kHz, calculate the mel scale frequency interval of each band:

$$\Delta m=\frac{m_{\max}-m_{\min}}{n_2}; \tag{9}$$

(9) For $f>1$ kHz, calculate the center frequency of each band:

$$f_i=(\exp((i\Delta m+1000)/1125)-1)/0.0016; \tag{10}$$

(10) For $f>1$ kHz, calculate the bandwidth of each band:

$$b_i=f_{i+1}-f_i; \tag{11}$$

Figure 10:
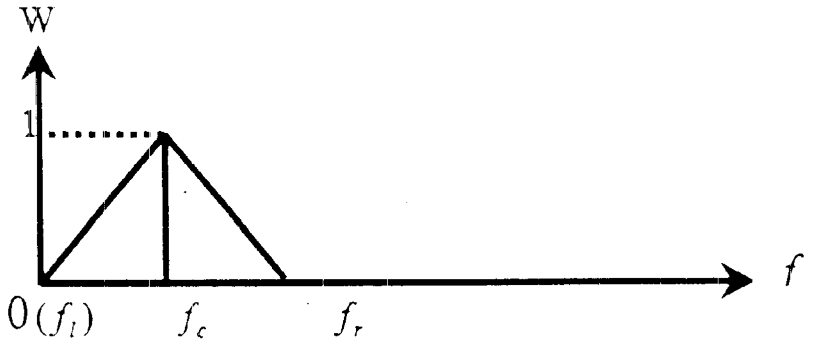
FIG. 10 is a graphical depiction of frequency characteristics.

(11) For each center frequency and bandwidth, determine a triangle window function such as that shown in FIG. 10, $$w=\begin{cases}\dfrac{1}{f_c-f_l}f-\dfrac{f_l}{f_c-f_l} & f_l\le f\le f_c\\[2ex] \dfrac{1}{f_c-f_r}f-\dfrac{f_r}{f_c-f_r} & f_c\le f\le f_r\end{cases}, \tag{12}$$

where $f_c$, $f_l$, $f_r$ are the center frequency, minimum frequency and maximum frequency of each band;

(12) For each band, calculate its spectral power:

$$P_i=\sum_{j=f_l}^{f_r} w_j s_j, \tag{13}$$

where $s_j$ is the spectrum of each frequency band;

(13) For bands satisfying $f_c \leqq 1000$ Hz, calculate their power summation:

$$P_{f\le 1\ \text{kHz}} = \sum_{f\le 1\ \text{kHz}} P_f;\ \text{and} \tag{14}$$

(14) For bands satisfying $f_c$>1000 Hz, calculate their power summation:

$$P_{f>1\ \text{kHz}} = \sum_{f>1\ \text{kHz}} P_f. \tag{15}$$

APPENDIX 2

An Echo Detection Method Using Cepstral Analysis

This process involves the following steps:

(1) For each audio frame $s_i(n)$, calculate the Fourier transformation:

$$S_i(e^{j\Omega})=F(s_i(n)); \tag{16}$$

(2) Take the complex Logarithm of $S_i(e^{j\Omega})$:

$$\log S_i(e^{j\Omega})=\log F(s_i(n)); \tag{17}$$

(3) Take the inverse Fourier transformation (cepstrum):

$$\bar{s}_i(n)=F^{-1}(\log F(s_i(n))); \tag{18}$$

(4) Take the autocorrelation of the cepstrum:

$$R_{\bar{s}\bar{s}}(n) = \sum_{m=-\infty}^{\infty} \bar{s}(n+m)\bar{s}(m); \tag{19}$$

(5) Search the time point ($\delta_i$) corresponding to a "power spike" of $R_{\bar{s}\bar{s}}(n)$; and (6) Determine the code corresponding to $\delta_i$.

APPENDIX 3

An Example of Content-sensitive Watermarking Modelling

1. Audio Clustering and Embedding Scheme Design

Suppose that there are only a limited number of audio signal classes in the frequency space. Given a set of sample data, or training data, audio clustering trains up a model to describe the classes. By observing the resulting clusters, embedding schemes can be established according to the their spectral characteristics as follows:

(1) Segment audio signal into m fixed-length frames;

(2) For each frame, extract the features using mel scale analysis:

$$V = \{\overset{\mu}{V}_1, \overset{\mu}{V}_2, \dots, \overset{\mu}{V}_m\}; \tag{20}$$

(3) Select four feature vectors in the vector space randomly and use them as the initial centroids of the four classes:

$$C = \{\overset{\mu}{C}_1, \overset{\mu}{C}_2, \overset{\mu}{C}_3, \overset{\mu}{C}_4\}; \tag{21}$$

(4) Classify the sample frames into the four partitions in the feature space using the nearest neighbour rule; For j=1 to 4, i=1 to m $$\overset{\mu}{V}_i \subseteq \text{class}(j) \text{ if } \min\left|\overset{\mu}{V}_i - \overset{\mu}{C}_j\right|$$

(5) Re-estimate the new centroids for each class:

$$\text{Class}(j) = \left\{\overset{\rho}{V}{}_1^{(j)}, \overset{\rho}{V}{}_2^{(j)}, \dots, \overset{\rho}{V}{}_{m_j}^{(j)}\right\} \tag{22}$$

$$\overset{\rho}{C}_j = \frac{1}{m_j}\sum_{i=1}^{m_j} \overset{\rho}{V}{}_i^{(j)}\ \ \sigma_j = \sqrt{\frac{1}{m_j}\sum_{i=1}^{m_j}\left|\overset{\rho}{V}{}_i^{(j)} - \overset{\rho}{C}_j\right|},$$

$$\text{where } j = 1, 2, 3, 4 \text{ and } \sum_j m_j = m;$$

(6) Steps (4) and (5) are iterated until a convergence criterion is satisfied;

(7) Establish an embedding table for bit zero and bit one according to the HAS model for each class. Time delay and energy are the major parameters:

Class 1: $\delta_{00}^{(1)}$, $\delta_{01}^{(1)}$, $\delta_{02}^{(1)}$, $\delta_{03}^{(1)}$, $\alpha_0^{(1)}$ (zero bit), $\delta_{10}^{(1)}$, $\delta_{11}^{(1)}$, $\delta_{12}^{(1)}$, $\delta_{13}^{(1)}$, $\alpha_1^{(1)}$ (one bit)

Class 2: $\delta_{00}^{(2)}$, $\delta_{01}^{(2)}$, $\delta_{02}^{(2)}$, $\delta_{03}^{(2)}$, $\alpha_0^{(2)}$ (zero bit), $\delta_{10}^{(2)}$, $\delta_{11}^{(2)}$, $\delta_{12}^{(2)}$, $\delta_{13}^{(2)}$, $\alpha_1^{(2)}$ (one bit)

Class 3: $\delta_{00}^{(3)}$, $\delta_{01}^{(3)}$, $\delta_{02}^{(3)}$, $\delta_{03}^{(3)}$, $\alpha_0^{(3)}$ (zero bit), $\delta_{10}^{(3)}$, $\delta_{11}^{(3)}$, $\delta_{12}^{(3)}$, $\delta_{13}^{(3)}$, $\alpha_1^{(3)}$ (one bit)

Class 4: $\delta_{00}^{(4)}$, $\delta_{01}^{(4)}$, $\delta_{02}^{(4)}$, $\delta_{03}^{(4)}$, $\alpha_0^{(4)}$ (zero bit), $\delta_{10}^{(4)}$, $\delta_{11}^{(4)}$, $\delta_{12}^{(4)}$, $\delta_{13}^{(4)}$, $\alpha_1^{(4)}$ (one bit)

$\alpha$ represents the energy and $\delta$ is the delay;

In addition, the number of echoes to embed is also decided by comparing two power summations:

If $P_{f\leqq 1\ kHz} \geqq 2P_{f>1\ kHz}$, then embed one echo in this frame:

Embedding parameters: ($\alpha_0^{(i)}$, $\delta_{00}^{(i)}$, $\delta_{01}^{(i)}$), ($\alpha_1^{(i)}$, $\delta_{10}^{(i)}$, $\delta_{11}^{(i)}$), ($\alpha_0^{(i)}$, $\delta_{00}^{(i)}$), ($\alpha_1^{(i)}$, $\delta_{11}^{(i)}$);

If $P_{f>1\ kHz} \leqq P_{f\leqq 1\ kHz} < 2P_{f>1\ kHz}$, then embed two echoes in this frame:

embedding parameters: ($\alpha_0^{(i)}$, $\delta_{00}^{(i)}$, $\delta_{01}^{(i)}$), ($\alpha_1^{(i)}$, $\delta_{10}^{(i)}$, $\delta_{11}^{(i)}$);

If $P_{f<1\ kHz} \leqq P_{71\ >1\ kHz} < 2P_{f\leqq 1\ kHz}$, then embed three echoes in this frame:

embedding parameters: ($\alpha_0^{(i)}$, $\delta_{00}^{(i)}$, $\delta_{01}^{(i)}$, $\delta_{02}^{(i)}$), ($\alpha_1^{(i)}$, $\delta_{10}^{(i)}$, $\delta_{11}^{(i)}$, $\delta_{12}^{(i)}$);

If $P_{f>1\ kHz} \geqq 2P_{f\leqq 1\ kHz}$, then embed four echoes in this frame:

embedding parameters: ($\alpha_0^{(i)}$, $\delta_{00}^{(i)}$, $\delta_{01}^{(i)}$, $\delta_{02}^{(i)}$, $\delta_{03}^{(i)}$), ($\alpha_1^{(i)}$, $\delta_{10}^{(i)}$, $\delta_{11}^{(i)}$, $\delta_{12}^{(i)}$, $\delta_{13}^{(i)}$)

2. Audio Classification and Embedding Scheme Selection (1) Segment the audio signal into m fixed-length frames;

(2) Classify a frame $S_i$ into one of the four classes by nearest neighbour rule:

$$S_i \in \text{Class}(j) \text{ if } \min\left|\overset{\omega}{V}_i - \overset{\omega}{C}_j\right|\ \ i = 1, 2, \cdots, m;\ \ j = 1, 2, 3, 4;$$

(3) Select an embedding scheme for each frame in the embedding parameters table according to its class identity and spectral analysis.

APPENDIX 4

An Audio Registration Method Based on Dynamic Time Warping

The DTW technique resolves an optimal alignment path between two audio signals. Both the audio signal under consideration and the reference audio signal are first segmented into fixed-length frames, and then the power spectral parameters in each frame are calculated using the mel scale method. An optimal path is generated that gives the minimum dissimilarity between the reference audio and the tested audio frame sequences. The registration is performed according to this optimal path whereby any possible shifting, scaling, or other non-linear time domain distortion can be detected and recovered.

(1) For the original audio s and the watermarked audio s', segment them with the same fixed-length. Frames of s and s' can be expressed as $s_i$(i=1, . . . , m) and $s'_j$(j=1, . . . , n);

(2) Extract features of the original and watermarked signals;

$$V_i=\{v_{i1}, v_{i2}, \ldots, v_{il}\}$$

$$V'_j=\{v'_{j1}, v'_{j2}, \ldots, v'_{jl}\}$$

where l is the channel number of mel scales;

(3) Find an optimal alignment path between the original and watermarked signals:

(a) Initialisation:

Define local constraints and global path constraints;

(b) Recursion:

For $1 \leq i \leq m$, $1 \leq j \leq n$ such that i and j stay within the allowable grid, calculate $$D_{ij} = \min_{(i',j')} [D_{i'j'} + \zeta((i', j'), (i, j))] \quad (23)$$

where $$\zeta((i', j'), (i, j)) = \sum_{l=0}^{L_s} d_{i-l,j-l} \quad (24)$$

with $L_s$ being the number of moves in the path from (i',j') to (i,j).

$$i-L_s=i',\ j-L_s=j' \quad (25)$$

$$d_{ij} = \sqrt{\sum_{k=1}^{l} (v_{ik} - v'_{jk})^2} \quad (26)$$

(c) Termination: $D_{mn}$ (d) Form an optimal path from (1,1) to (m,n) according to $D_{mn}$:

$$P=\{p_{ij} \mid i \in [1, \ldots, m], j \in [1, \ldots, n]\} \quad (27)$$

(4) Register the watermarked audio with the original audio according to the optimal path:

For $p_{ij} \in P$

If i<j, add the ith frame of s to s';

If i>j, remove the jth frame from s'.

The claims defining the invention are as follows:

1. A method of embedding a watermark in a digital audio signal, said method including the steps of:

embedding at least one echo dependent upon said watermark in a portion of said digital audio signal, predefined characteristics of said at least one echo being dependent upon time and/or frequency domain characteristics of said portion of said digital audio signal to provide a substantially inaudible and robust embedded watermark in said digital audio signal.

2. The method according to claim 1, further including the step of digesting said digital audio signal to provide a watermark key, said watermark being dependent upon said watermark key.

3. The method according to claim 2, further including the step of encrypting predetermined information using said watermark key to form said watermark.

4. The method according to claim 1, further including the step of generating said at least one echo to have a delay and an amplitude relative to said digital audio signal that is substantially inaudible.

5. The method according to claim 1, wherein the value of said delay and said amplitude are programmable.

6. The method according to claim 1, wherein two or more echoes are programmably sequenced having different delays and/or amplitudes.

7. The method according to claim 1, wherein two portions of said digital audio signal are embedded with different echoes dependent upon the time and/or frequency characteristics of said digital audio signal.

8. An apparatus for embedding a watermark in a digital audio signal, said apparatus including:

means for determining time and/or frequency domain characteristics of said digital audio signal;

means for embedding at least one echo dependent upon said watermark in a portion of said digital audio signal, predefined characteristics of said at least one echo being dependent upon said time and/or frequency domain characteristics of said portion of said digital audio signal to provide a substantially inaudible and robust embedded watermark in said digital audio signal.

9. The apparatus according to claim 8, further including means for digesting said digital audio signal to provide a watermark key, said watermark being dependent upon said watermark key.

10. The apparatus according to claim 9, further including means for encrypting predetermined information using said watermark key to form said watermark.

11. The apparatus according to claim 8, further including means for generating said at least one echo to have a delay and an amplitude relative to said digital audio signal that is substantially inaudible.

12. The apparatus according to claim 8, wherein the value of said delay and said amplitude are programmable.

13. The apparatus according to claim 8, wherein two or more echoes are programmably sequenced having different delays and/or amplitudes.

14. The apparatus according to claim 8, wherein two portions of said digital audio signal are embedded with different echoes dependent upon the time and/or frequency characteristics of said digital audio signal.

15. A computer program product having a computer readable medium having a computer program recorded therein for embedding a watermark in a digital audio signal, said computer program product including:

means for determining time and/or frequency domain characteristics of said digital audio signal;

means for embedding at least one echo dependent upon said watermark in a portion of said digital audio signal, predefined characteristics of said at least one echo being dependent upon said time and/or frequency domain characteristics of said portion of said digital audio signal to provide a substantially inaudible and robust embedded watermark in said digital audio signal.

16. The computer program product according to claim 15, further including means for digesting said digital audio signal to provide a watermark key, said watermark being dependent upon said watermark key.

17. The computer program product according to claim 16, further including means for encrypting predetermined information using said watermark key to form said watermark.

18. The computer program product according to claim 15, further including means for generating said at least one echo to have a delay and an amplitude relative to said digital audio signal that is substantially inaudible.

19. The computer program product according to claim 15, wherein the value of said delay and said amplitude are programmable.

20. The computer program product according to claim 15, wherein two or more echoes are programmably sequenced having different delays and/or amplitudes.

21. The computer program product according to claim 15, wherein two portions of said digital audio signal are embedded with different echoes dependent upon the time and/or frequency characteristics of said digital audio signal.

22. A method of extracting a watermark from a watermarked digital audio signal, said method including the steps of:

detecting at least one echo embedded in a portion of said watermarked digital audio signal, predefined characteristics of said at least one echo being dependent upon time and/or frequency domain characteristics of said portion of a corresponding original digital audio signal; and decoding said at least one detected echo recover said watermark.

23. The method according to claim 22, further including the step of registering said watermarked digital audio signal with said original audio signal to recover from any distortions and/or modifications of said watermarked digital audio signal.

24. The method according to claim 22, wherein said decoding step is dependent upon an embedding scheme.

25. The method according to claim 22, further comprising the step of decrypting one or more codes produced by said decoding step dependent upon a digested digital audio signal.

26. The method according to claim 22, wherein said at least one echo has a delay and an amplitude relative to said digital audio signal that is substantially inaudible.

27. The method according to claim 26, wherein the value of said delay and said amplitude are programmable.

28. The method according to claim 22, wherein two or more echoes are programmably sequenced having different delays and/or amplitudes.

29. The method according to claim 22, wherein two portions of said watermarked digital audio signal is embedded with different echoes dependent upon the time and/or frequency characteristics of said original digital audio signal.

30. An apparatus for extracting a watermark from a watermarked digital audio signal, said apparatus including:

means for detecting at least one echo embedded in a portion of said watermarked digital audio signal, predefined characteristics of said at least one echo being dependent upon time and/or frequency domain characteristics of said portion of a corresponding original digital audio signal; and means for decoding said at least one detected echo recover said watermark.

31. The apparatus according to claim 30, further means for registering said watermarked digital audio signal with said original audio signal to recover from any distortions and/or modifications of said watermarked digital audio signal.

32. The apparatus according to claim 30, wherein said decoding means is dependent upon an embedding scheme.

33. The apparatus according to claim 30, further comprising means for decrypting one or more codes produced by said decoding step dependent upon a digested digital audio signal.

34. The apparatus according to claim 30, wherein said at least one echo has a delay and an amplitude relative to said digital audio signal that is substantially inaudible.

35. The apparatus according to claim 34, wherein the value of said delay and said amplitude are programmable.

36. The apparatus according to claim 30, wherein two or more echoes are programmably sequenced having different delays and/or amplitudes.

37. The apparatus according to claim 30, wherein two portions of said watermarked digital audio signal is embedded with different echoes dependent upon the time and/or frequency characteristics of said original digital audio signal.

38. A computer program product having a computer readable medium having a computer program recorded therein for extracting a watermark from a watermarked digital audio signal, said computer program product including:

means for detecting at least one echo embedded in a portion of said watermarked digital audio signal, predefined characteristics of said at least one echo being dependent upon time and/or frequency domain characteristics of said portion of a corresponding original digital audio signal; and means for decoding said at least one detected echo recover said watermark.

39. The computer program product according to claim 38, further means for registering said watermarked digital audio signal with said original audio signal to recover from any distortions and/or modifications of said watermarked digital audio signal.

40. The computer program product according to claim 38, wherein said decoding means is dependent upon an embedding scheme.

41. The computer program product according to claim 38, further comprising means for decrypting one or more codes produced by said decoding step dependent upon a digested digital audio signal.

42. The computer program product according to claim 38, wherein said at least one echo has a delay and an amplitude relative to said digital audio signal that is substantially inaudible.

43. The computer program product according to claim 42, wherein the value of said delay and said amplitude are programmable.

44. The computer program product according to claim 38, wherein two or more echoes are programmably sequenced having different delays and/or amplitudes.

45. The computer program product according to claim 38, wherein two portions of said watermarked digital audio signal is embedded with different echoes dependent upon the time and/or frequency characteristics of said original digital audio signal.

46. A method of embedding a watermark in a digital audio signal, said method including the steps of:

generating a digital watermark;

adaptively segmenting said digital audio signal dependent upon at least one frequency and/or time domain characteristic into two or more frames containing respective portions of said digital audio signal;

classifying each frame dependent upon at least one frequency and/or time domain characteristic of said portion of said digital audio signal in said frame; and embedding at least one echo in at least one of said frames, said echo being dependent upon said watermark and upon a classification of each frame determined by said classifying step, whereby a watermarked digital audio signal is produced.

47. The method according to claim 46, wherein said watermark is dependent upon said digital audio signal.

48. The method according to claim 47, further including the steps of:

audio digesting said digital audio signal to provide an audio digest; and encrypting watermark information dependent upon said audio digest.

49. The method according to claim 46, further including the step of extracting one or more features from each frame of said digital audio signal.

50. The method according to claim 49, further including the step of selecting an embedding scheme for each frame dependent upon said classification of each frame, said embedding scheme adapted dependent upon at least one time and/or frequency domain characteristic of said classification for the corresponding portion of said digital audio signal.

51. The method according to claim 50, further including the step of embedding said at least one echo in at least one of said frames dependent upon the selected embedding scheme.

52. The method according to claim 51, wherein the amplitude and the delay of said echo relative to the corresponding portion of said digital audio signal in said frame is defined dependent upon the embedding scheme so as to be inaudible.

53. The method according to claim 52, wherein at least two echoes are embedded in said frame.

54. The method according to claim 46, wherein two or more echoes embedded in said digital audio signal are dependent upon a bit of said watermark.

55. An apparatus for embedding a watermark in a digital audio signal, said apparatus including:

means for generating a digital watermark;

means for adaptively segmenting said digital audio signal dependent upon at least one frequency and/or time domain characteristic into two or more frames containing respective portions of said digital audio signal;

means for classifying each frame dependent upon at least one frequency and/or time domain characteristic of said portion of said digital audio signal in said frame; and means for embedding at least one echo in at least one of said frames, said echo being dependent upon said watermark and upon a classification of each frame determined by said classifying means, whereby a watermarked digital audio signal is produced.

56. The apparatus according to claim 55, wherein said watermark is dependent upon said digital audio signal.

57. The apparatus according to claim 56, further including:

means for audio digesting said digital audio signal to provide an audio digest; and means for encrypting watermark information dependent upon said audio digest.

58. The apparatus according to claim 55, further including means for extracting one or more features from each frame of said digital audio signal.

59. The apparatus according to claim 58, further including means for selecting an embedding scheme for each frame dependent upon said classification of each frame, said embedding scheme adapted dependent upon at least one time and/or frequency domain characteristic of said classification for the corresponding portion of said digital audio signal.

60. The apparatus according to claim 59, further including means for embedding said at least one echo in at least one of said frames dependent upon the selected embedding scheme.

61. The apparatus according to claim 60, wherein the amplitude and the delay of said echo relative to the corresponding portion of said digital audio signal in said frame is defined dependent upon the embedding scheme so as to be inaudible.

62. The apparatus according to claim 61, wherein at least two echoes are embedded in said frame.

63. The apparatus according to claim 55, wherein two or more echoes embedded in said digital audio signal are dependent upon a bit of said watermark.

64. A computer program product having a computer readable medium having a computer program recorded therein for embedding a watermark in a digital audio signal, said computer program product including:

means for generating a digital watermark;

means for adaptively segmenting said digital audio signal dependent upon at least one frequency and/or time domain characteristic into two or more frames containing respective portions of said digital audio signal;

means for classifying each frame dependent upon at least one frequency and/or time domain characteristic of said portion of said digital audio signal in said frame; and means for embedding at least one echo in at least one of said frames, said echo being dependent upon said watermark and upon a classification of each frame determined by said classifying means, whereby a watermarked digital audio signal is produced.

65. The computer program product according to claim 64, wherein said watermark is dependent upon said digital audio signal.

66. The computer program product according to claim 65, further including:

means for audio digesting said digital audio signal to provide an audio digest; and means for encrypting watermark information dependent upon said audio digest.

67. The computer program product according to claim 64, further including means for extracting one or more features from each frame of said digital audio signal.

68. The computer program product according to claim 67, further including means for selecting an embedding scheme for each frame dependent upon said classification of each frame, said embedding scheme adapted dependent upon at least one time and/or frequency domain characteristic of said classification for the corresponding portion of said digital audio signal.

69. The computer program product according to claim 68, further including means for embedding said at least one echo in at least one of said frames dependent upon the selected embedding scheme.

70. The computer program product according to claim 69, wherein the amplitude and the delay of said echo relative to the corresponding portion of said digital audio signal in said frame is defined dependent upon the embedding scheme so as to be inaudible.

71. The computer program product according to claim 70, wherein at least two echoes are embedded in said frame.

72. The computer program product according to claim 64, wherein two or more echoes embedded in said digital audio signal are dependent upon a bit of said watermark.

73. A method of extracting a watermark from a watermarked digital audio signal, said method including the steps of:

adaptively segmenting said watermarked digital audio signal into two or more frames containing corresponding portions of said watermarked digital audio signal;

detecting at least one echo present in said frames; and code mapping said at least one detected echo to extract an embedded watermark, said mapping being dependent upon one or more embedding schemes used to embed said at least one echo in said watermarked digital audio signal.

74. The method according to claim 73, further including the step of audio registering said watermarked digital audio signal with said original digital audio signal to determine any unauthorised modifications of said watermarked digital audio signal.

75. The method according to claim 73, further including the step of decrypting said embedded watermark dependent upon an audio digest signal to derive watermark information, said audio digest signal being dependent upon an original digital audio signal.

76. An apparatus for extracting a watermark from a watermarked digital audio signal, said apparatus including:

means for adaptively segmenting said watermarked digital audio signal into two or more frames containing corresponding portions of said watermarked digital audio signal;

means for detecting at least one echo present in said frames; and means for code mapping said at least one detected echo to extract an embedded watermark, said mapping being dependent upon one or more embedding schemes used to embed said at least one echo in said watermarked digital audio signal.

77. The apparatus according to claim 76, further including means for audio registering said watermarked digital audio signal with said original digital audio signal to determine any unauthorised modifications of said watermarked digital audio signal.

78. The apparatus according to claim 76, further including means for decrypting said embedded watermark dependent upon an audio digest signal to derive watermark information, said audio digest signal being dependent upon an original digital audio signal.

79. A computer program product having a computer readable medium having a computer program recorded therein for extracting a watermark from a watermarked digital audio signal, said computer program product including:

means for adaptively segmenting said watermarked digital audio signal into two or more frames containing corresponding portions of said watermarked digital audio signal;

means for detecting at least one echo present in said frames; and means for code mapping said at least one detected echo to extract an embedded watermark, said mapping being dependent upon one or more embedding schemes used to embed said at least one echo in said watermarked digital audio signal.

80. The computer program product according to claim 79, further including means for audio registering said watermarked digital audio signal with said original digital audio signal to determine any unauthorised modifications of said watermarked digital audio signal.

81. The computer program product according to claim 79, further including means for decrypting said embedded watermark dependent upon an audio digest signal to derive watermark information, said audio digest signal being dependent upon an original digital audio signal.

* * * * *